Patented Sept. 11, 1928.

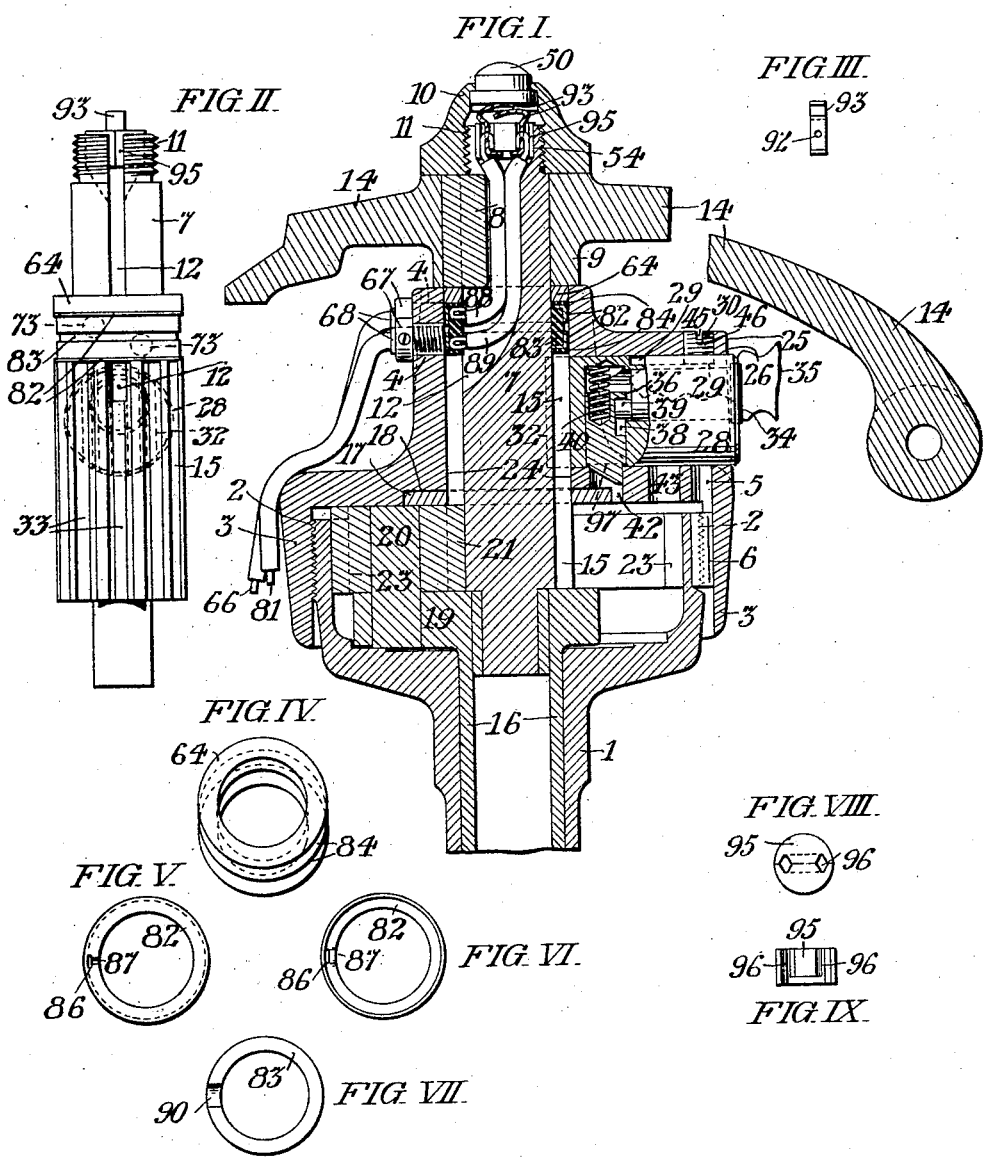

1,683,913

UNITED STATES PATENT OFFICE.

ARTHUR E. PAIGE, OF PHILADELPHIA, PENNSYLVANIA.

VEHICLE LOCK AND SIGNALING DEVICE.

Original application filed January 26, 1924, Serial No. 688,819. Divided and this application filed December 29, 1924. Serial No. 758,712.

This is a division of my application Serial No. 688,819; which latter includes claims for the locking mechanism herein disclosed.

My invention is particularly applicable to steering mechanism for self-propelled vehicles, such as automobiles, motor boats, airplanes, etc., including a steering shaft provided with a rotary steering wheel mounted to turn in a tubular column or post, and provides locking means for detachably rigidly connecting the steering shaft with the steering column, so as to prevent the vehicle from being steered when locked, and means whereby an electric circuit, for instance, a signaling system in the vehicle, is arranged to be controlled by a switch appliance upon the steering shaft in cooperative relation with a terminal or terminals held stationary by said column.

Although the locking mechanism which I have chosen for illustration includes a lock body, of a pin key type, which is mounted to reciprocate radially in a casing formed in a screw cap which serves as a cover of the internal gear case which is a stationary fixture at the top of the steering column of the "Ford" type, and thus resembles the structure shown in Letters Patent of the United States 1,425,408 granted to James A. Murphey August 8, 1922; in that patented structure the steering shaft is provided with a primarily separate sleeve having recesses to engage the lock body, and it is necessary to employ the key both to set the lock body in engagement with said sleeve, and to effect its withdrawal from such engagement. On the contrary, in the form of my invention herein shown, the steering shaft is provided with means in unitary relation therewith arranged to directly engage the lock body, without the interposition of any sleeve, and the lock body may be engaged with the steering shaft, to render the steering mechanism inoperative, without the employment of the key; the latter being required only to release and effect the withdrawal of the lock body from its locked position. Therefore, my improvement in that respect is advantageous, first, in that it is less costly to construct and, second, that it is more convenient to operate.

Moreover, in electric signaling systems of the prior art, a push button is carried by the steering wheel and connected with the other parts of the system by flexible wires secured at one end upon the steering wheel and at the other end upon some stationary part of the vehicle, necessitating the provision of a considerable extent of such wires, so disposed that they may be coiled or uncoiled, or otherwise flexed, with every movement of the steering wheel throughout the complete rotation of the latter in either direction with reference to the stationary steering column. Such wires are not only unsightly and inconvenient in that they extend in such position that they must be continually avoided by the operator, but the repeated flexure to which they are subjected tends to loosen their terminal connections and thus render the circuit inoperative, whereas, it is, of course, highly desirable to maintain it continuously operative.

Therefore, a purpose and effect of my present invention are to provide a construction and arrangement avoiding the necessity for employment of any such flexible conductors between the rotary steering wheel and the stationary steering column, and to provide means to otherwise effect the desired electrical connections. In the form of my invention hereinafter described, all of the parts of the electrical system which are movable by the wheel are in fact carried by the steering shaft independently of the wheel, and include a push button terminal at the upper end of said shaft, in coaxial relation therewith, connected by a wire with an annular contact band encircling said shaft but insulated therefrom; said wire being extended between said terminal and said band in a radially extending slot in said shaft, which slot also serves as a seat for the spline key whereby said shaft is connected with the steering wheel.

My invention includes the various novel features of construction and arrangement hereinafter more definitely specified.

In said drawings; Fig. I is a vertical sectional view showing a two-wire circuit including the push button switch.

Fig. II is a side elevation of the steering shaft and its appurtenances shown in Fig. I.

Fig. III is an elevation of one of the spring switch terminals shown in Figs. I and II.

Fig. IV is a plan view of the metal ring which tightly fits the steering shaft beneath the steering wheel in Fig. I, and the insulating rings which have the same diameters.

Figs. V and VI are respectively axially opposite plan views of one of the electric contact bands shown encircling said shaft in Fig. I.

Fig. VII is a plan view of the insulating ring which extends between said bands in Fig. I.

Fig. VIII is a plan view of the split insulating bushing which holds the spring switch terminals shown in Fig. I.

Fig. IX is an inside face view of one of the halves of said bushing shown in Fig. VIII.

In said figures; I have shown a form of my invention adapted for embodiment in an automobile having steering mechanism of the "Ford" type, i. e., including a train of planetary gearing. The stationary steering column 1 is provided with the external screw thread 2 adapted to be engaged by the stationary column head cover or cap 3. Said cap has two screw sockets 4 extending radially near the upper end thereof to hold the electrical contact devices shown in Fig. I. Said cap has the key socket 5 adapted to receive a cylindrical key 6 which is driven downward therein across said screw thread 2, to normally prevent said cap from being unscrewed from said column, but which may be driven upward and out as hereinafter described. The steering shaft 7 is mounted to rotate in said column 1 and is operatively connected, by the key 8, with the steering wheel hub 9 which is detachably secured on said shaft by the nut 10 engaging the screw thread 11 at the upper end of said shaft. As shown in Fig. I; said key extends in the radial slot 12 in said shaft 7. Said steering wheel conveniently includes the spider 14 extending from said hub 9, and either rigidly or pivotally connected to an annular steering wheel rim; the arm extending to the right from said hub in Fig. I, but broken off, being provided at its outer end with a pivotal connection for a tiltable form of steering wheel, as shown in Fig. I.

Said steering shaft 7, known to the trade as the "drive pinion shaft" has, in unitary relation therewith, the pinion teeth 15 forming the "sun" gear of the planetary train. Said shaft 7 is journaled at its lower end in the drive pinion shaft bushing 16 which is rotatable in said column 1 and is held downward therein by the flange ring 17, which is drive fitted around said shaft and extends in a complementary recess 18 in said cap 3, as shown in Fig. I. Said bushing 16 has, at its upper end, three arms 19 carrying respective stud shafts 20, parallel with said shaft 7. Three planetary pinions 21 are mounted to turn upon said stud shafts 20 in mesh with said pinion teeth 15 and in mesh with the internal orbital gear 23, which latter is formed in unitary relation with said column 1.

Said internal gear case cover or cap 3 has the axial bore 24 concentric with the axis of said shaft 7 and fitted to the circumference of said pinion teeth; so that said shaft is thus journaled in said cover 3.

Said internal gear case cover 3 also has, in unitary relation therewith, the lock casing 25 with the radial cylindrical lock socket 26 with which the teeth of said pinion 15 are adapted to successively register in every rotary position of said shaft 7. The primarily separate lock 28 includes a cylindrical body fitted to reciprocate in said lock socket 26; the extent of its reciprocation being limited by the slot 29 in its top, in which the screw 30 extends in rigid relation with said lock casing 25 and in axial alinement with said key seat 5, so that, when said screw 30 is removed, and said lock body withdrawn from its socket, said key 6 may be driven downward into the position shown in Fig. I or may be driven upward and outward from that position.

As shown in Figs. I and II; the inner end of said lock body 28 is transversely corrugated by grooves forming ridges 32 fitted to engage anywhere in the circumferential series of locking recesses 33 between the pinion teeth 15 which are in unitary relation with said shaft 7. The rotation of said shaft 7 is thus prevented when said lock body is engaged therewith as indicated in Fig. I; thus preventing operation of the steering mechanism which is connected to the lower end of said bushing 16.

Said lock 28 has pin tumblers extending radially in the thickest part of its wall around the cylindrical bore formed, eccentric to but parallel with its axis, for the rotary key barrel 34; which barrel is rotatable by the removable key 35, to retract the detent or locking plunger 36 shown in Fig. I. Said body has a transverse, diametrical, bore for said plunger, intersecting the axes of said body and barrel. Said plunger has the transverse, segmental, crank notch 38 therein which is adapted to receive the crank 39 projecting from the inner end of said rotary key barrel 34.

Said plunger has a cylindrical spring seat, eccentric to the plunger axis so as to clear its slot and hold a spring 40 tending to project the plunger 36 which is thus adapted for alternate engagement in the detent recesses 42 and 43 in said cap 3, to detain said lock body 28 in either its inner locked position shown or in its outer unlocked position.

When said key 35 is turned to retract the detent plunger 36 from the detent recess 42, and the lock body 28 is withdrawn to the limit of its slot 29, said plunger 36 registers with said recess 43 and is automatically thrust therein, by said spring 40, to hold said lock body 28 out of engagement with said steering shaft 7 and thus permit the vehicle to be steered. Although in such unlocked position, said detent plunger 36 is spring pressed into said detent recess 43, enough to prevent the accidental inward movement of said body 28 to locked position; said body may be thrust inward, by the finger or thumb of the operator, without using said key 35; such movement of the lock body merely causing the cam ended plunger 36 to ride over the inner edge of the recess 43 and be thus thrust into said body 28, against the pressure of said spring 40, until said plunger registers with the detent recess 42 into which it is automatically thrust by said spring to the position shown in Fig. II, to detain said lock body 28 in the locked position above described and shown in Fig. I.

Said key 35 may be withdrawn from said lock 28 whenever the plunger 36 is projected, but cannot be withdrawn from the lock when said plunger is retracted into the lock body and, consequently, said key 35 serves as a handle by which said lock body 28 may be reciprocated.

Of course, when said screw 30 is withdrawn from said slot 29, said lock body 28 may be withdrawn from its casing 25 in said cover 3, being thus separable from said cover. However, in the ordinary use of this form of my invention, said screw 30 remains in the position shown in Fig. I, and said lock 28 is continuously carried in said cover 3 which, as above described, is stationary in the automobile; its rotation and removal from the column 1 being normally prevented by the key 6 aforesaid. In order to prevent accidental dislodgment of said screw 30 from the position shown in the drawings; I prefer to provide a transverse slot 45 in the upper surface of said lock casing 25 with which the slot in said screw 30 is adapted to register as shown in Fig I, and to slightly project the metal of said screw 30, at 46, into engagement with said casing 25 in said slot 45 by striking the top of said screw with a center punch. However, such projection of the metal of the screw is only sufficient to prevent its accidental dislodgment and not sufficient to prevent its forcible operation by a screw driver.

As shown in Figs. I and II; said shaft 7 is encircled by two electric contact bands 82 which are L-shaped in cross section, precisely alike, but disposed in axially opposite spaced relation in which they are held by the insulating ring 83 shown in section in Fig. I and in plan in Fig. VII. Said two bands 82 are also insulated by the two rings 84 shown in section in Fig. I and in plan in Fig. IV. Said rings 84 are conveniently plane washers of vulcanized fibre, of the same diameter as the ring 64 which is drive fitted on the shaft 7 so as to form an abutment thereon beneath said hub 9 and to rigidly secure said insulating elements and said contact bands on said shaft 7.

As indicated in Figs. I, V and VI; each of said contact bands 82 has a perforation 86 adjoining a bight 87 displaced axially from the plane of its transverse flange, to receive and engage the lower end of its respective conducting wire 88 or 89. As shown in Fig. I; said wires 88 and 89 have covers insulating them from said shaft 7, and their lower ends are respectively hooked and clinched in engagement with the bights of said contact bands 82; such connection being alike in both bands but the latter being axially opposed; with said hooked ends of the wires 88 and 89 respectively extending in axially opposite recesses 90 in said insulating ring 83.

Said wires 88 and 89 extend upwardly in the spline key slot 12 in said shaft 7 and their upper ends are similarly hooked and clinched through respective perforations 92 in the spring switch terminals 93. Said terminals are stampings which are primarily precisely alike but are bent differently in assembling them so that one overlaps the other, as shown in Fig. I. The upper end of one of said spring terminals 93 bears against the under side of the push button 50 to normally uphold the latter and break the circuit between said terminals 93. However, the circuit may be closed by depressing said button to press the upper ends of said terminals 93 in contact with each other. Said terminals 93 are supported in insulated relation with said shaft 7 in the split insulating bushing 95, which is tightly fitted in the cylindrical seat 54 in the top of said shaft. One-half of said bushing 95 is shown in Figs. I and IX and both halves are assembled in Figs. II and VIII. As best shown in Fig. VIII; said bushing 95 has two sockets 96 for said spring switch terminals 93 formed by oppositely counterpart recesses in the diametrically opposite halves of said bushing which are precisely alike.

When in assembled position, as shown in Fig. 1, said bands 82 are respectively in electrical connection with the contacts 73 which are indicated in Fig. II and which are respective cylindrical spring pressed plungers arranged to reciprocate in the insulating bushings 67 which are screwed into the cap 3 and provided with respective wire conductors 66 and 81 thus continuously maintained in electrical connection with said conductors 88 and 89 respectively.

It is to be understood that the switch mechanism above described may be directly included in any electric circuit, by means of said double wire connections 66 and 81. For instance, such circuit may include an electric generator and an audible or visible signaling device or other translating device thus arranged to be energized by pressure upon said button 50.

Of course, in what is termed a single wire circuit, which is ordinarily used in some types of automobiles, one of the switch terminals 93 may be grounded upon the adjacent automobile structure and the other terminal 93 provided with its connections above described;

thus permitting the omission of one of the bands 82 and the contact 73 which cooperates therewith; so that the connections for one side of such single wire circuit are made through the mechanical parts of the automobile structure.

Moreover, although I have found it convenient to illustrate my invention in connection with steering mechanism of the peculiar "Ford" type; it is to be understood that it is not limited to such an embodiment. Therefore, I do not desire to limit myself to the precise details of construction and arrangement herein set forth, as it is obvious that various modifications may be made therein without departing from the essential features of my invention, as defined in the appended claims.

I claim:

1. A vehicle steering wheel shaft for steering mechanism of the planetary gear type; having a screw thread at one end, sun gear teeth, terminating adjacent the other end and extending toward said screw thread; and having a spline key slot extending radially to the axis of said shaft and from the screw threaded end thereof and terminating between two of said gear teeth; constructed and arranged to form a seat for an electric conductor, held in position by said spline key; an electric conductor extending in said slot; and a spline key in said slot securing said conductor in position.

2. A vehicle steering wheel shaft having a screw thread at one end, gear teeth terminating adjacent the other end and extending toward said screw thread; and having a spline key slot extending radially to the axis of said shaft and from the screw threaded end thereof toward said gear teeth; said slot of such depth as to form a seat for an electric conductor; an electric conductor extending in said slot; and means in said slot securing said conductor in position.

3. In a vehicle steering wheel shaft for steering mechanism of the planetary gear type; having two annular electric contact bands and means rigidly supporting said bands in insulated relation with said shaft; connectors respectively extending from said bands to the upper end of said shaft, through the latter; switch contacts respectively attached to the upper ends of said connectors; and insulating means holding said contacts in said shaft.

4. In a vehicle steering wheel shaft for steering mechanism of the planetary gear type; having two annular electric contact bands and means rigidly supporting said bands in insulated relation with said shaft; connectors respectively extending from said bands to the upper end of said shaft, through the latter; switch contacts respectively attached to the upper ends of said connectors; and insulating means holding said contacts in said shaft, including a split bushing of insulating material having complementary receses for said contacts and arranged to be tightly fitted in a seat in the end of said shaft.

5. A vehicle steering wheel shaft having an annular band in concentric relation therewith; means rigidly supporting said band in insulated relation with said shaft; and a switch connector, electrically connected at one end to said band and extending through said shaft to the upper end thereof.

6. A structure as in claim 5; having a screw thread at the upper end of the shaft; a nut fitted to said screw thread; and a push button switch plunger mounted to reciprocate in said nut; whereby said switch contacts carried by the shaft may be operated by said push button, but said nut may be removed and replaced without movement of any of the electrical connections.

In testimony whereof, I have hereunto signed my name at Philadelphia, Pennsylvania, this twenty-seventh day of December, 1924.

ARTHUR E. PAIGE.